(12) United States Patent
Waldmann et al.

(10) Patent No.: US 7,510,286 B2
(45) Date of Patent: Mar. 31, 2009

(54) EXTERIOR REARVIEW MIRROR FOR VEHICLES, PREFERABLY FOR MOTOR VEHICLES

(76) Inventors: Bernd Waldmann, Frundsbergstr. 25, 72622, Nürtingen (DE); Klaus Weller, In den Messenwiesen 79, 73061, Ebersbach (DE); Florin Secanu, Am Kirchert 5, 72622, Nürtingen (DE); Karl-Heinz Leonberger, Karlstr. 9/1, 73269, Hochdorf (DE)

( * ) Notice: Subject to any disclaimer, the term of this patent is extended or adjusted under 35 U.S.C. 154(b) by 229 days.

(21) Appl. No.: 11/177,120

(22) Filed: Jul. 8, 2005

(65) Prior Publication Data
US 2006/0018046 A1  Jan. 26, 2006

(30) Foreign Application Priority Data
Jul. 8, 2004  (DE) .................... 10 2004 032 997

(51) Int. Cl.
*G02B 5/08* (2006.01)
(52) U.S. Cl. ..................................... 359/841
(58) Field of Classification Search ................ 359/841, 359/871, 877, 872–876; 248/475.1, 476, 248/477–479
See application file for complete search history.

(56) References Cited

U.S. PATENT DOCUMENTS 4,740,066 A * 4/1988 Whitehead ................. 359/841
5,074,653 A    12/1991 Mittelhauser
5,959,790 A *  9/1999 Hempelmann .............. 359/841
6,092,778 A *  7/2000 Lang et al. ................. 248/478
6,565,218 B2 * 5/2003 Pirner et al. ................ 359/841
2002/0006002 A1  1/2002 Pirner et al.

FOREIGN PATENT DOCUMENTS

| DE | 28 57 558 | 7/1980 |
| DE | 44 22 843 | 1/1996 |
| EP | 0 003 608 | 2/1979 |
| GB | 2 049 797 | 12/1980 |
| WO | WO 92/16391 | 10/1992 |

* cited by examiner

*Primary Examiner*—Euncha P Cherry (57) ABSTRACT

Exterior rearview mirror for vehicles, preferably for motor vehicles. The exterior rearview mirror has a mirror base with a bracket. Supported on the mirror base is a mirror head with a bracket that can be folded about one axis in the direction of travel and one axis opposite the direction of travel. In order to design the exterior rearview mirror to ensure foldability of the mirror head in a simple manner, the brackets on the mirror-head side and mirror-base side are each equipped with joint parts that are detachably connected to one another to form the two pivot/fold axes for the mirror head. As a result, the exterior rearview mirror is economical to manufacture and also to assemble. Due to the small number of components and its lack of susceptibility to problems, the exterior rearview mirror is especially suitable for use in motor vehicles.

19 Claims, 16 Drawing Sheets

EXTERIOR REARVIEW MIRROR FOR VEHICLES, PREFERABLY FOR MOTOR VEHICLES

CROSS-REFERENCE TO RELATED APPLICATIONS

This application claims priority to German Patent Application No. 10 2004 032 997.4 filed Jul. 8, 2004.

BACKGROUND OF THE INVENTION

The invention concerns an exterior rearview mirror for vehicles, preferably for motor vehicles.

In exterior rearview mirrors of motor vehicles, the mirror head can be folded relative to the mirror base about one upright axis in the vehicle's direction of travel and one such axis opposite the direction of travel when an appropriate force acts on the mirror head. In order to allow this foldability, an intermediate link is arranged between the mirror base and mirror head, permitting the mirror head to fold in both directions relative to the mirror base. The intermediate link must be manufactured and assembled separately, increasing the cost of the exterior rearview mirror.

The object of the invention is to design an exterior rearview mirror such that the foldability of the mirror head is ensured in a simple manner.

This object is attained in accordance with the invention in an exterior rearview mirror.

SUMMARY OF THE INVENTION

In the inventive exterior rearview mirror, no separate intermediate link is provided between the mirror base and mirror head. The brackets on the mirror-head side and mirror-base side are each equipped with joint parts that cooperate with one another and form the respective pivot/fold axis for the mirror head. As a result, the inventive exterior rearview mirror is economical to manufacture and also to assemble. Moreover, the inventive exterior rearview mirror is characterized by a small number of components, by which means the susceptibility of the exterior rearview mirror to problems can be kept low.

Additional features of the invention are apparent from the other claims, the description, and the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail on the basis of an example embodiment shown in the drawings. The drawings show.

DETAILED DESCRIPTION OF THE PREFERRED EMBODIMENTS

In the drawings, only the brackets 1 and 2 of the mirror head 3 and mirror base 4 of the exterior rearview mirror are shown. The brackets 1, 2 are located in a known way in housings that are not shown for reasons of clarity. Arranged in a known manner on the bracket 1 of the mirror head 3 are the mirror glass bracket with the mirror glass, an actuating drive for the mirror glass bracket if present, and additional components accommodated in the mirror head, such as a heater, a turn signal repeater lamp, a perimeter light, a camera, a sensor for automatic darkening of an EC mirror glass, a compass, a microphone, and the like.

Figure 4:
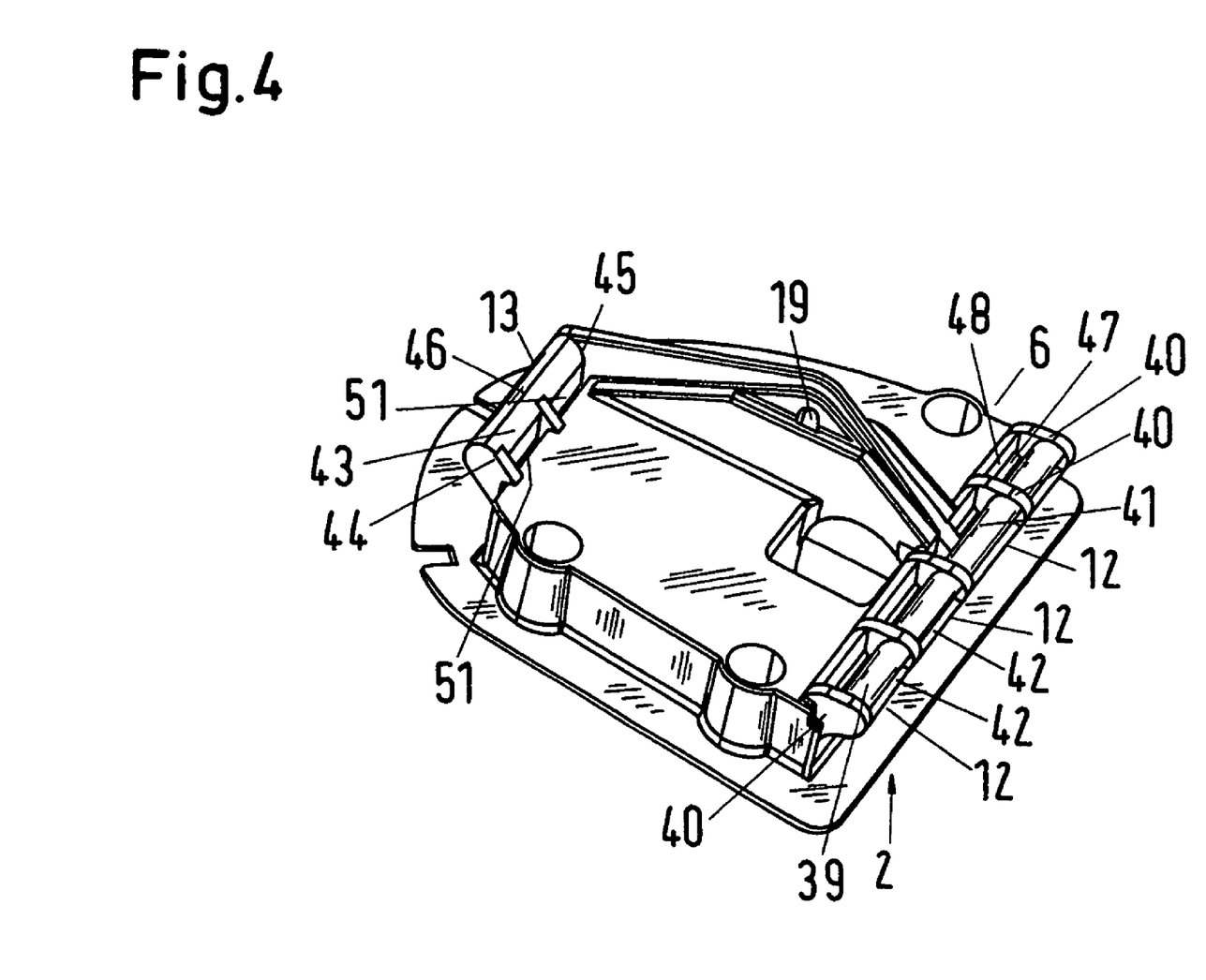
Figure 6:
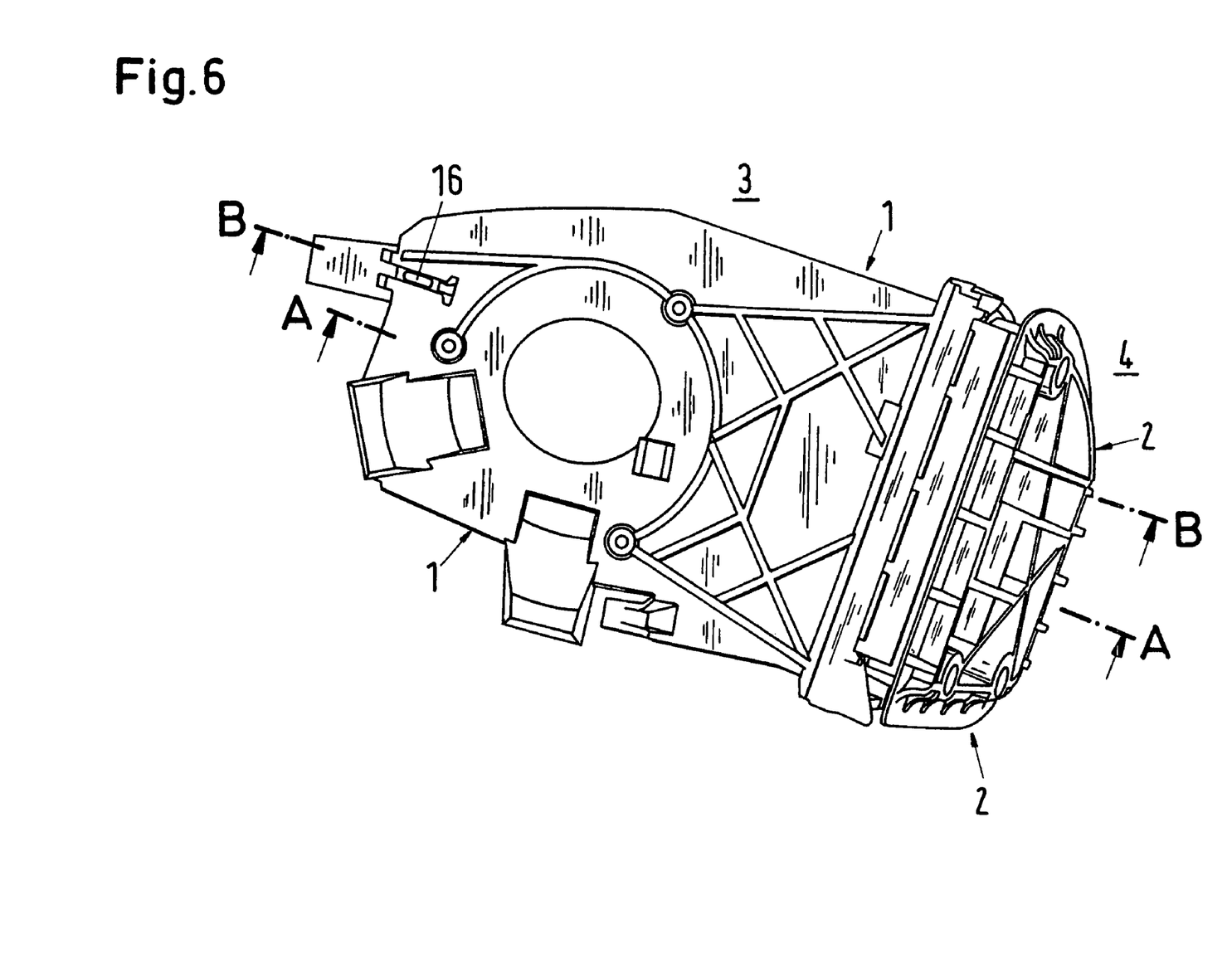
Figure 7:
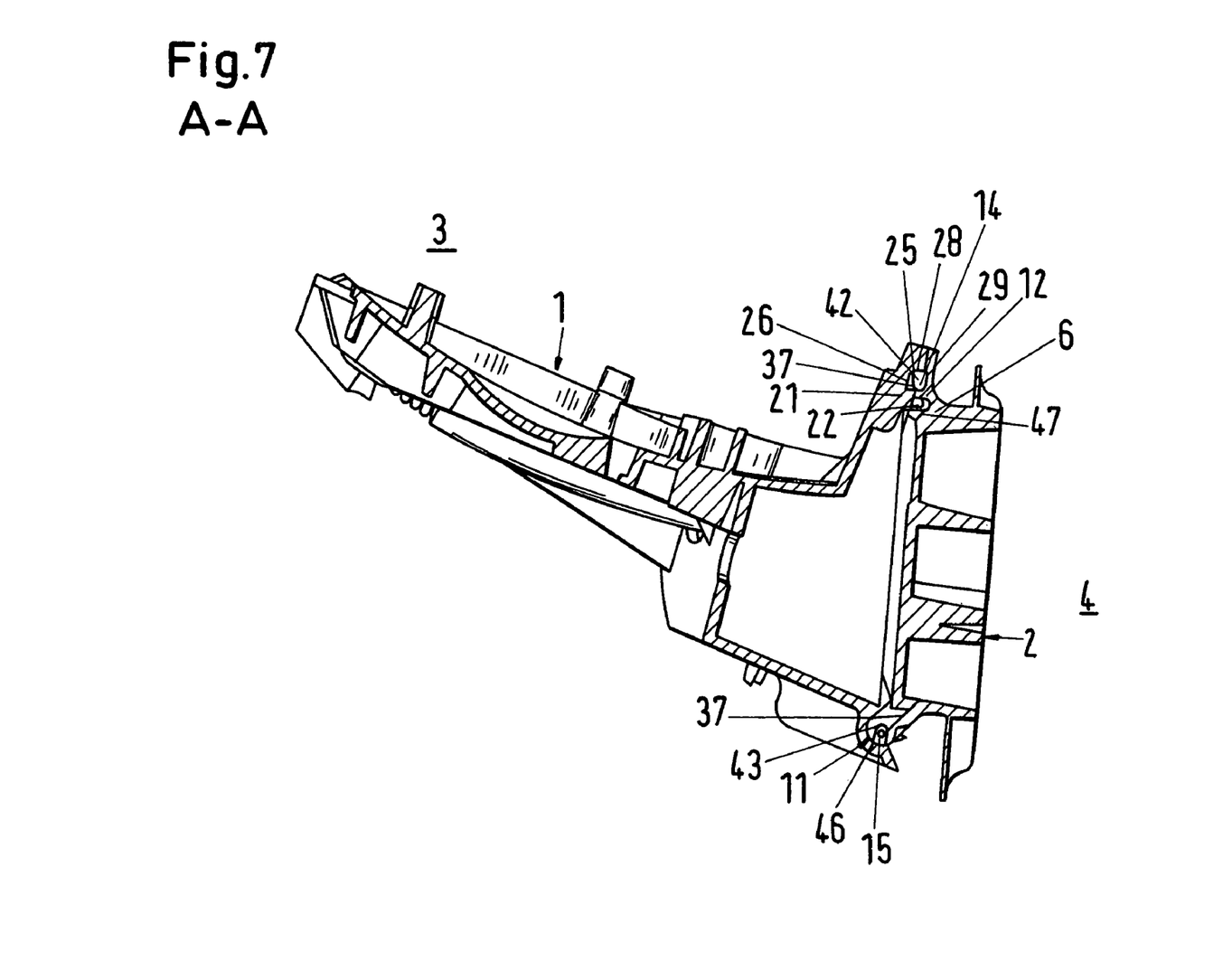
Figure 8:
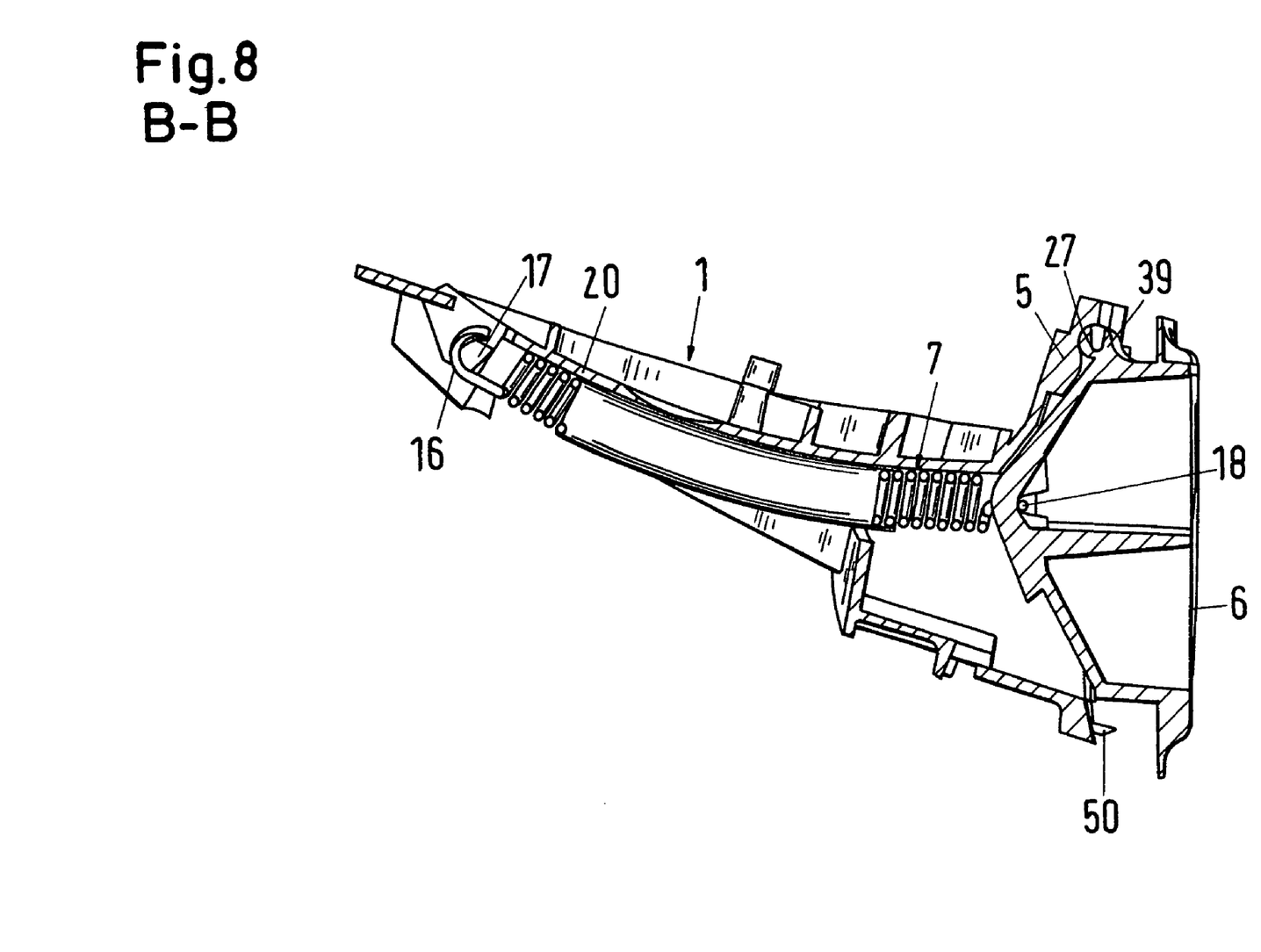
Figure 9:
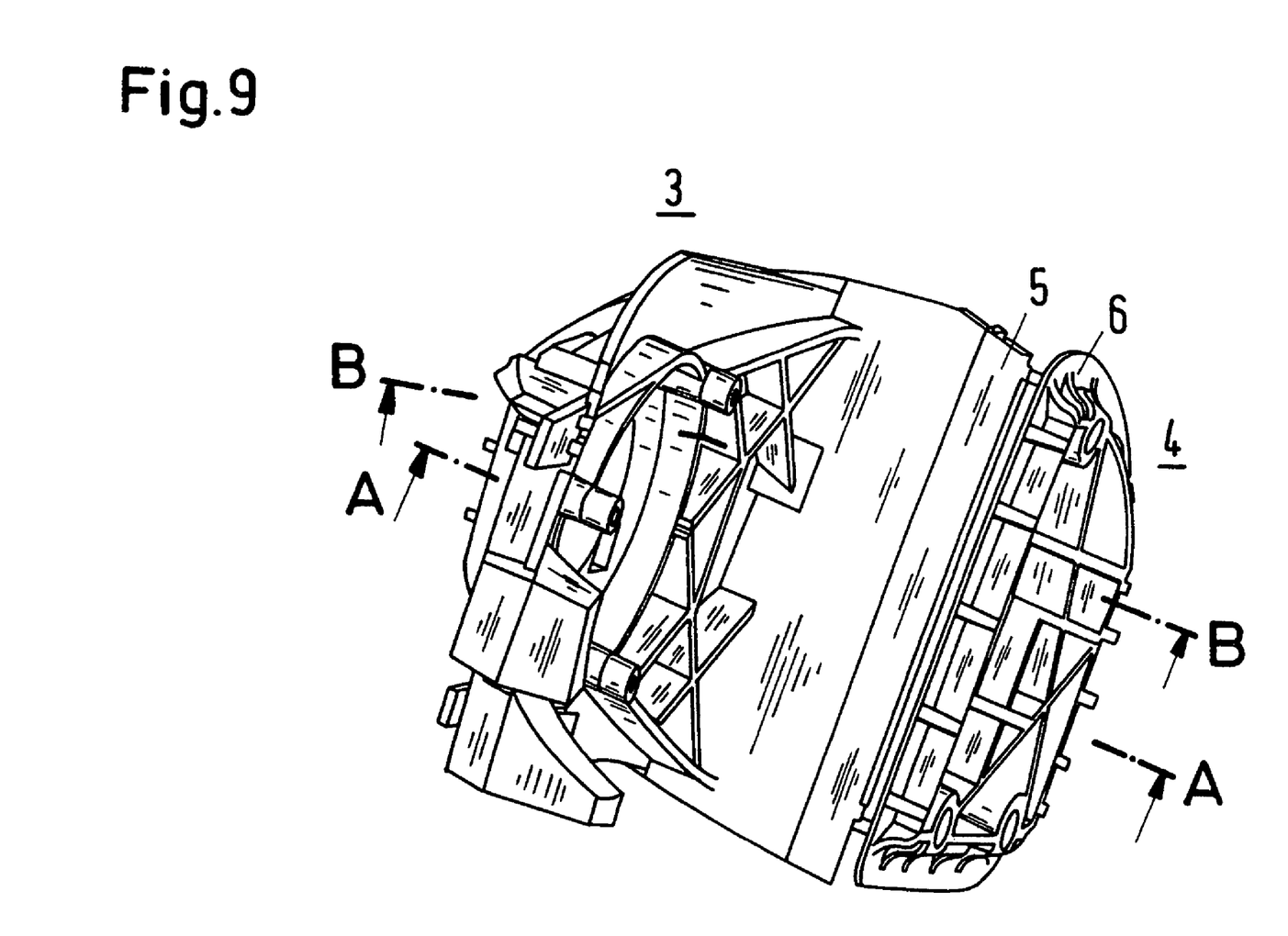
Figure 10:
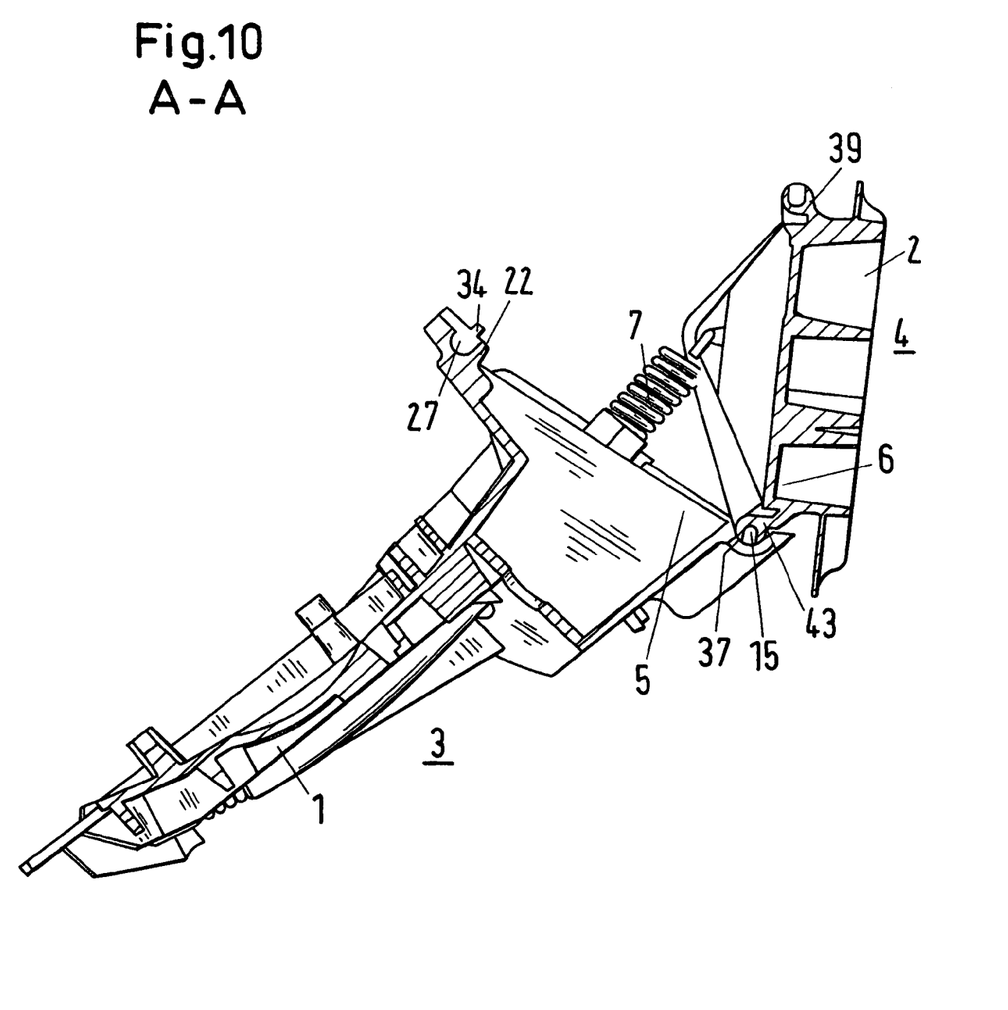
Figure 11:
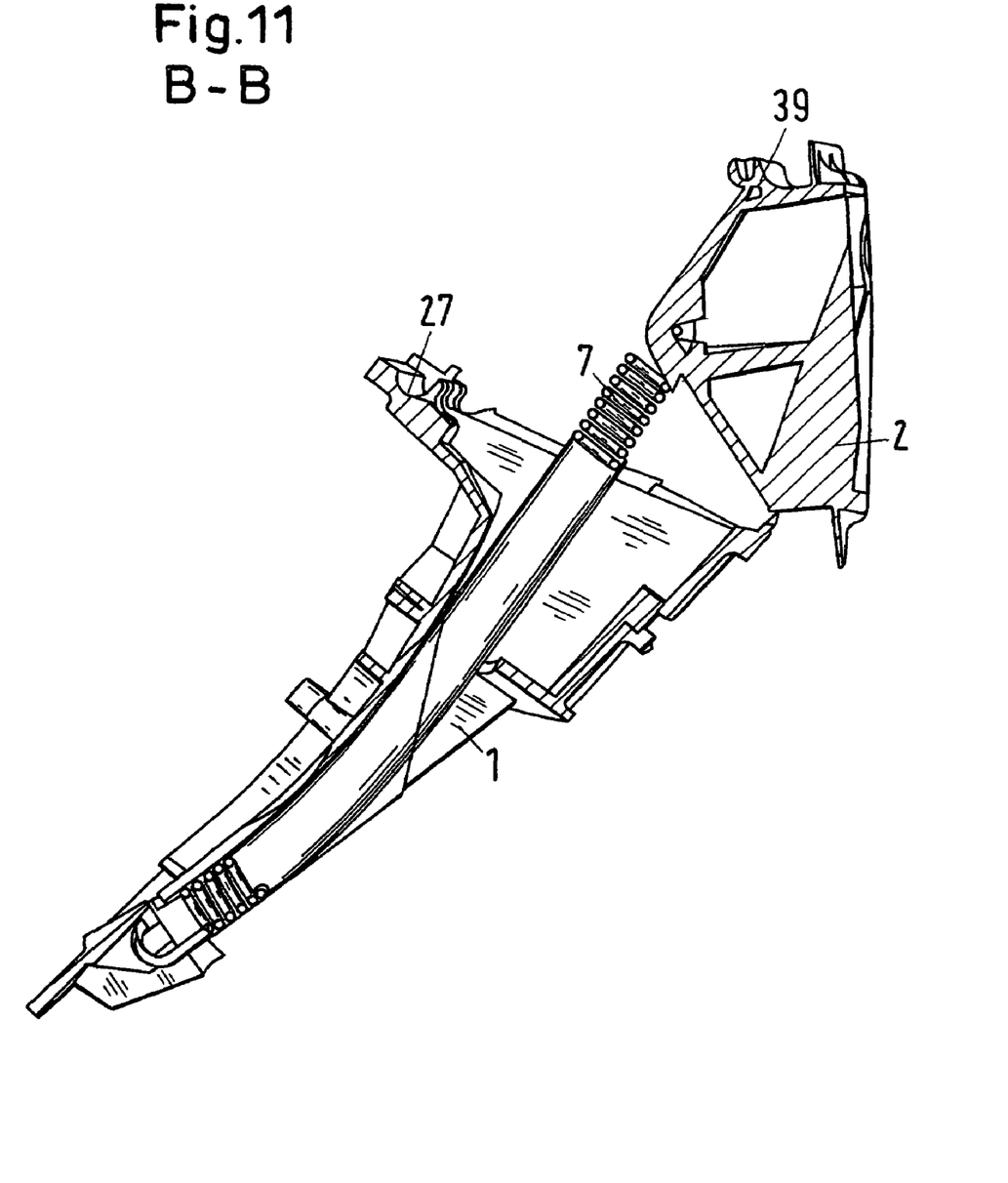
Figure 12:
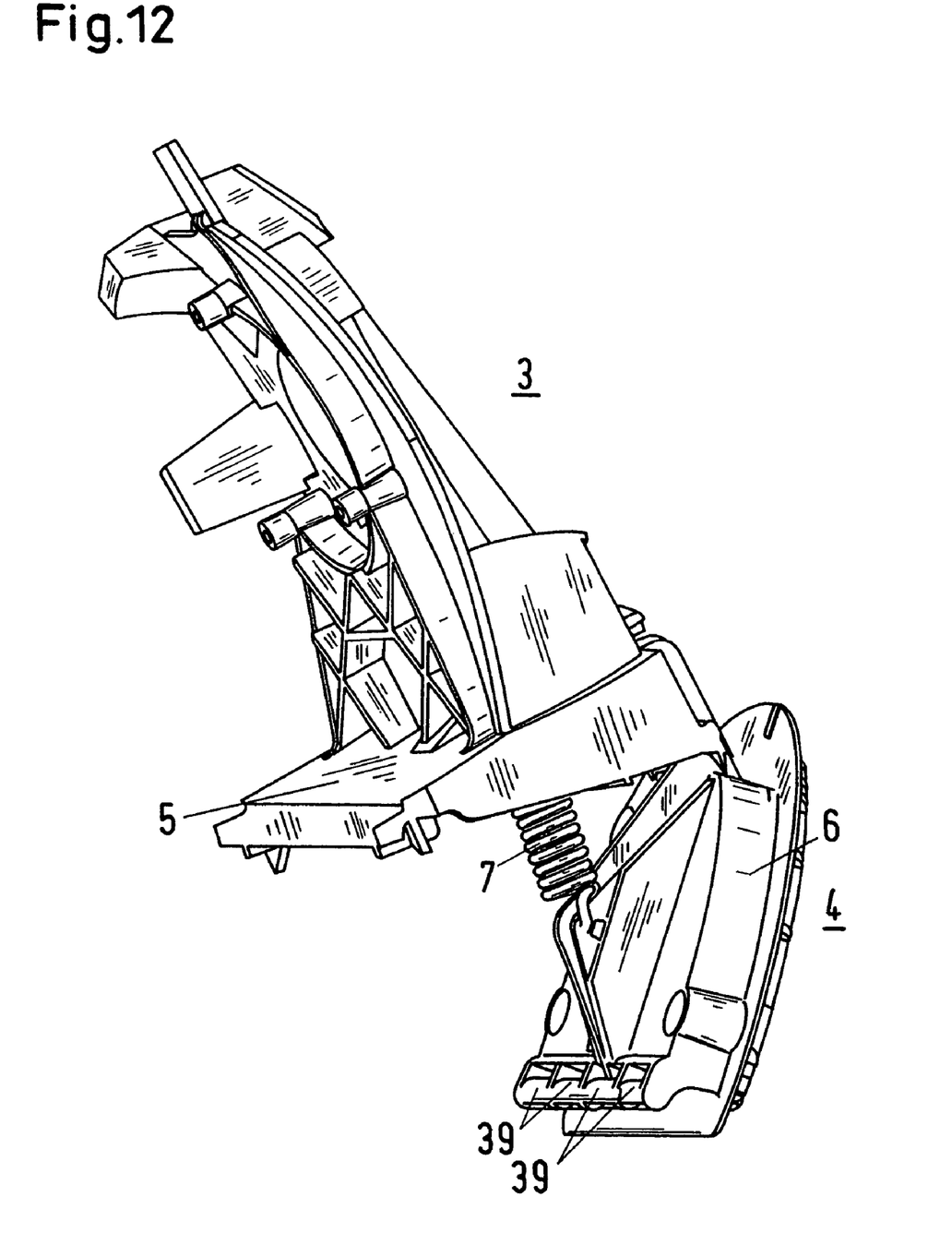
Figure 13:
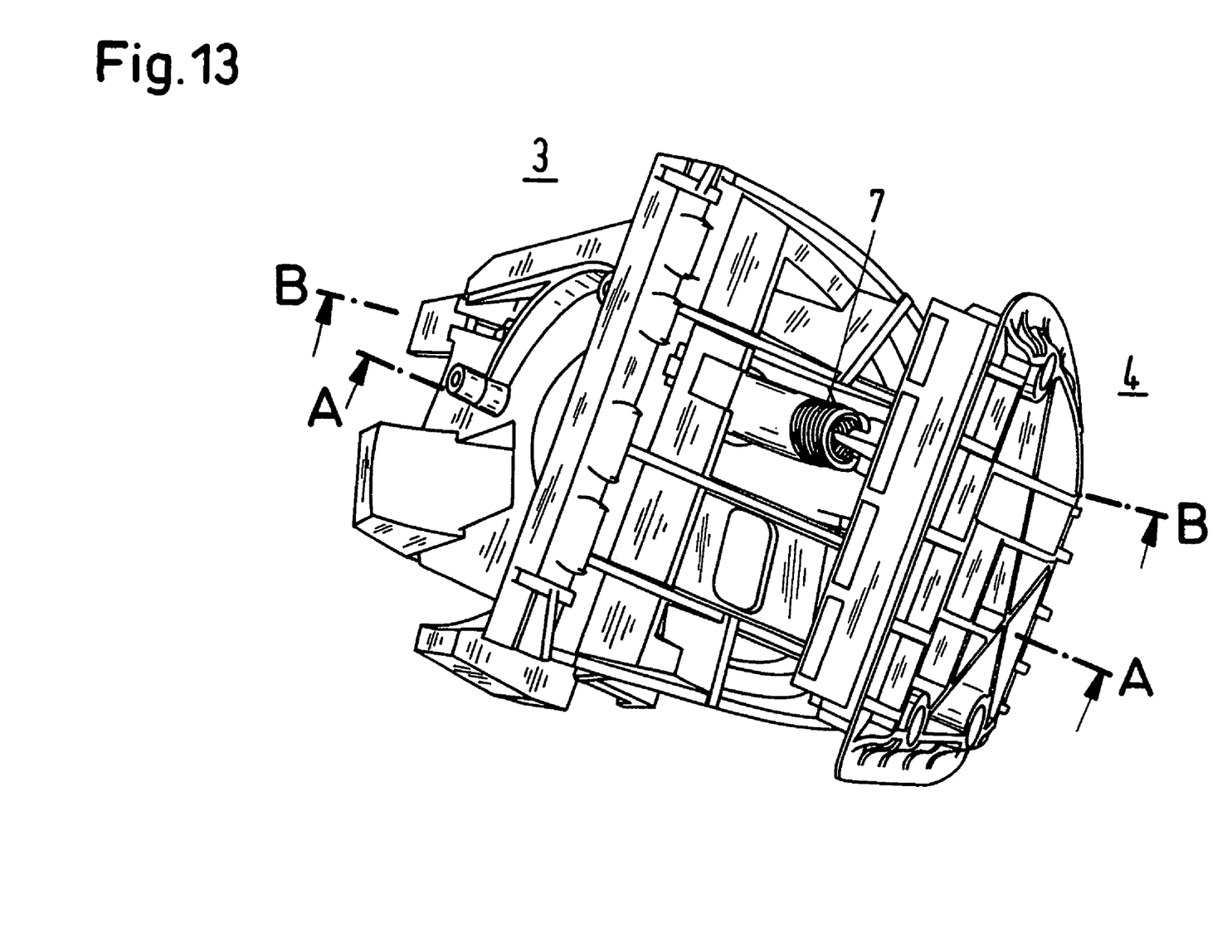
Figure 14:
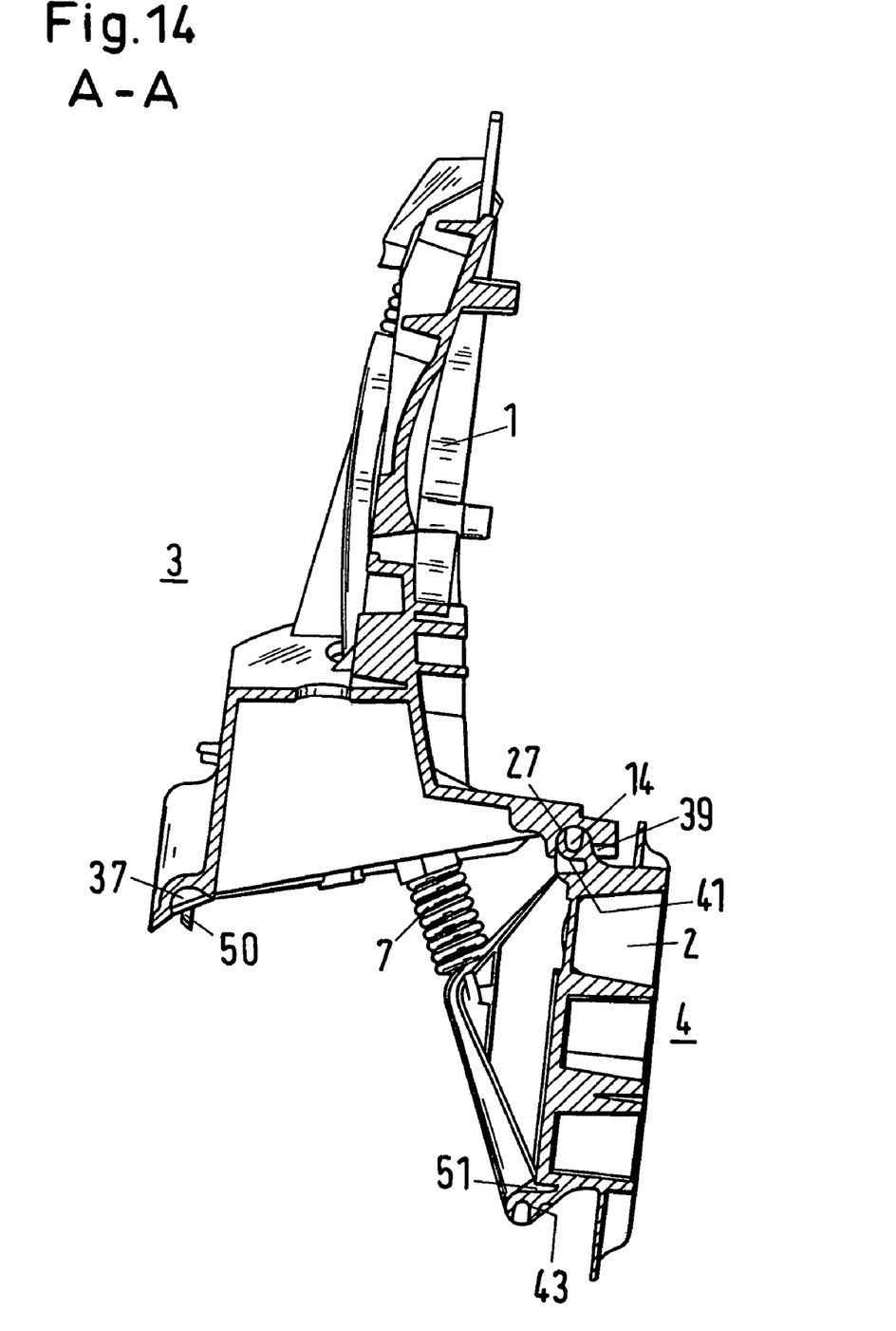
Figure 15:
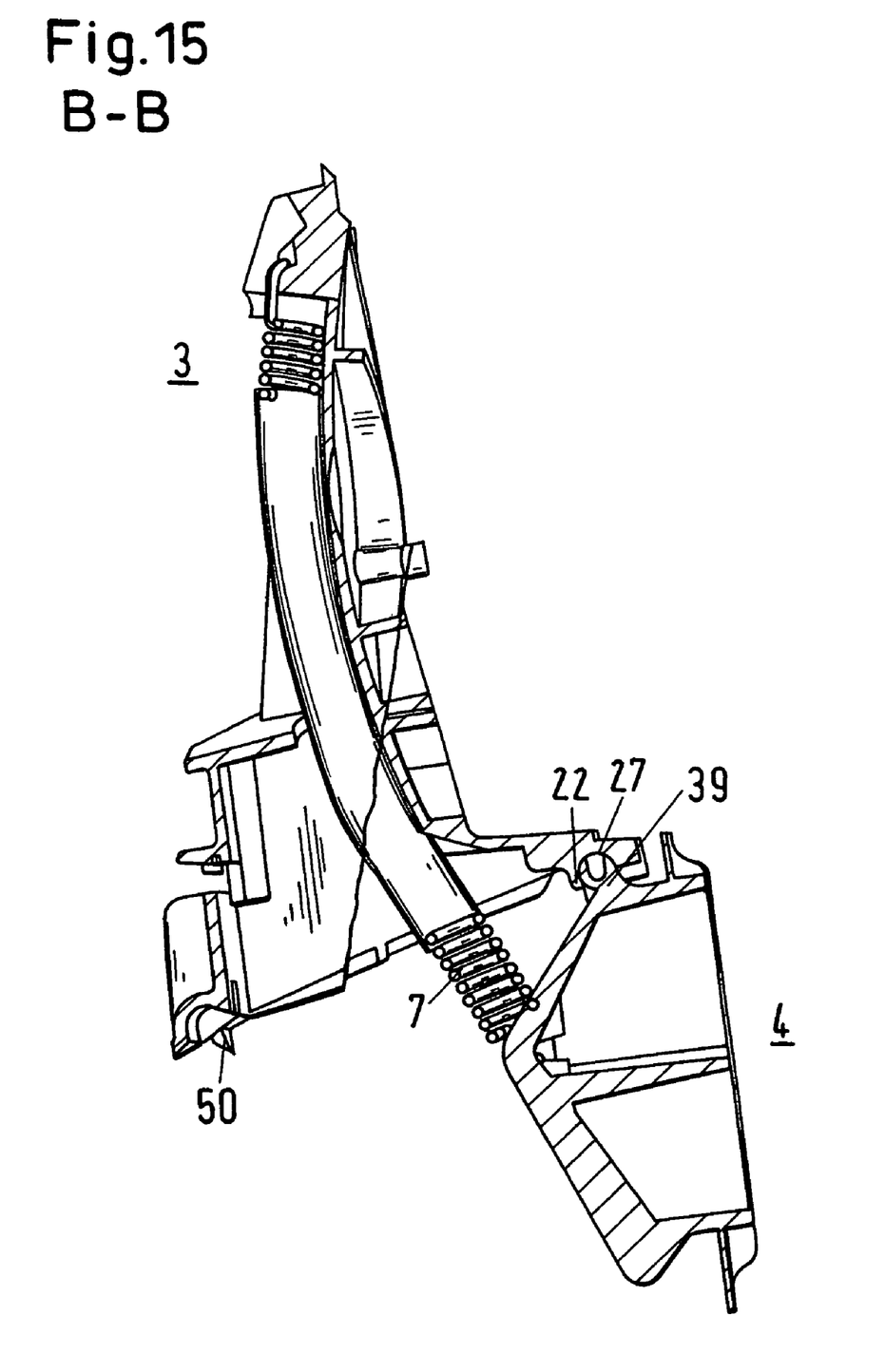
Figure 16:
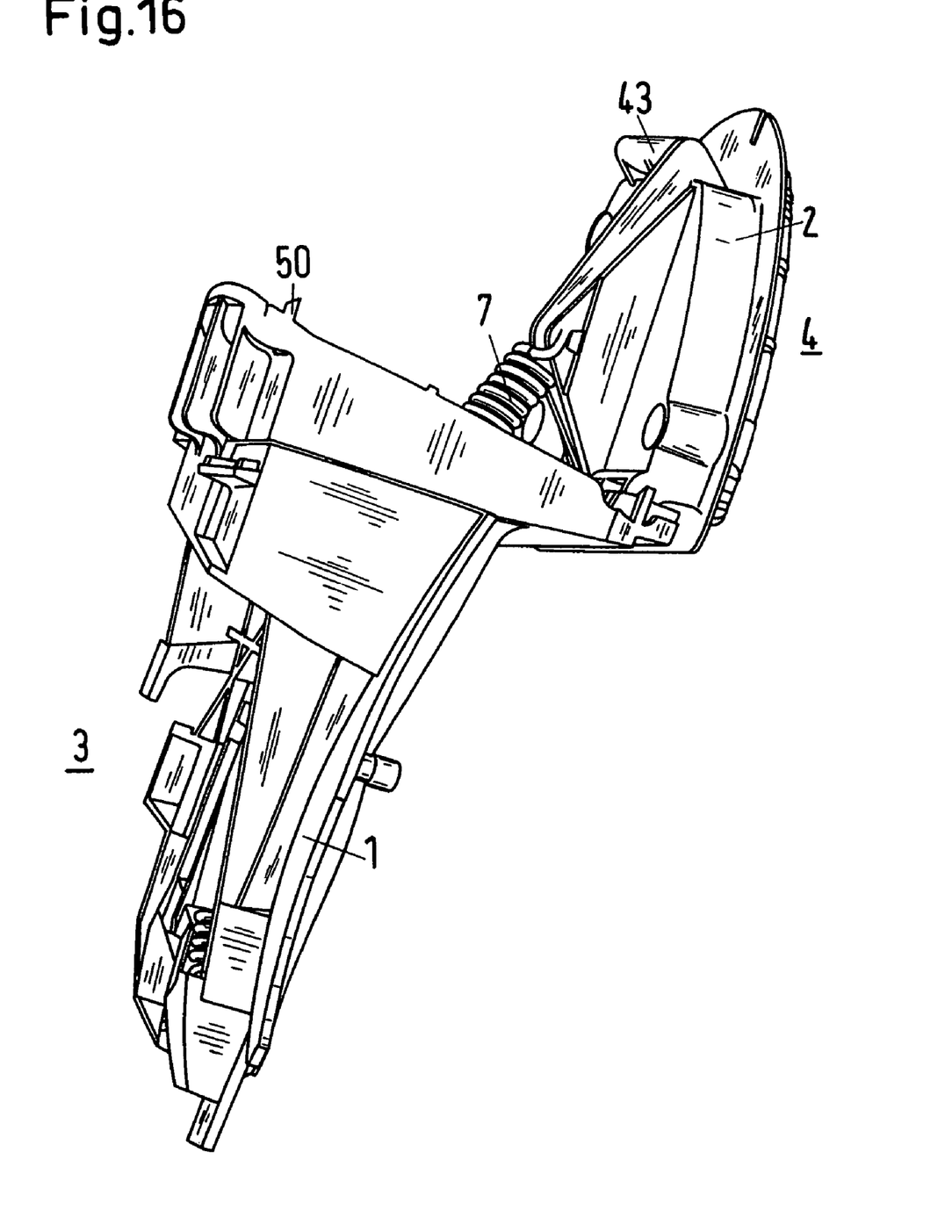

The bracket 1 of the mirror head 3 has a connecting part 5 with which the bracket can be linked to a connecting part 6 (FIG. 4) of the mirror base 4. The brackets 1, 2 are joined together in a pivoting manner by their connecting parts 5, 6. FIGS. 6 through 8 show the two brackets 1, 2 in their initial position where the connecting parts 5, 6 are drawn firmly against one another by the force of at least one tension spring 7 (FIG. 8). In this operating position, the mirror head 3 projects laterally from the vehicle. The bracket 2 of the mirror base 4 is affixed to the vehicle door in a known manner. The connecting part 5 of the bracket 1 has stiffening ribs 8 parallel to and spaced apart from one another, so the connecting part 5 has high strength and stiffness. The connecting part 5 is provided on two opposite sides with joint parts 9, 10 and 11, which cooperate with joint parts 12, 13 of the bracket 2 (FIG. 4). The two brackets 1, 2 are connected together in an articulated manner by the joint parts 9 through 13 such that the bracket 1, and thus the mirror head 3, can fold relative to the mirror base 4 both toward and away from the direction of travel of the vehicle. The joint parts 9 through 13 form two pivot axes 14 and 15 (FIG. 7) located one behind the other and spaced apart in the direction of travel and oriented transverse to the direction of travel and approximately perpendicular to the ground.

Figure 5:
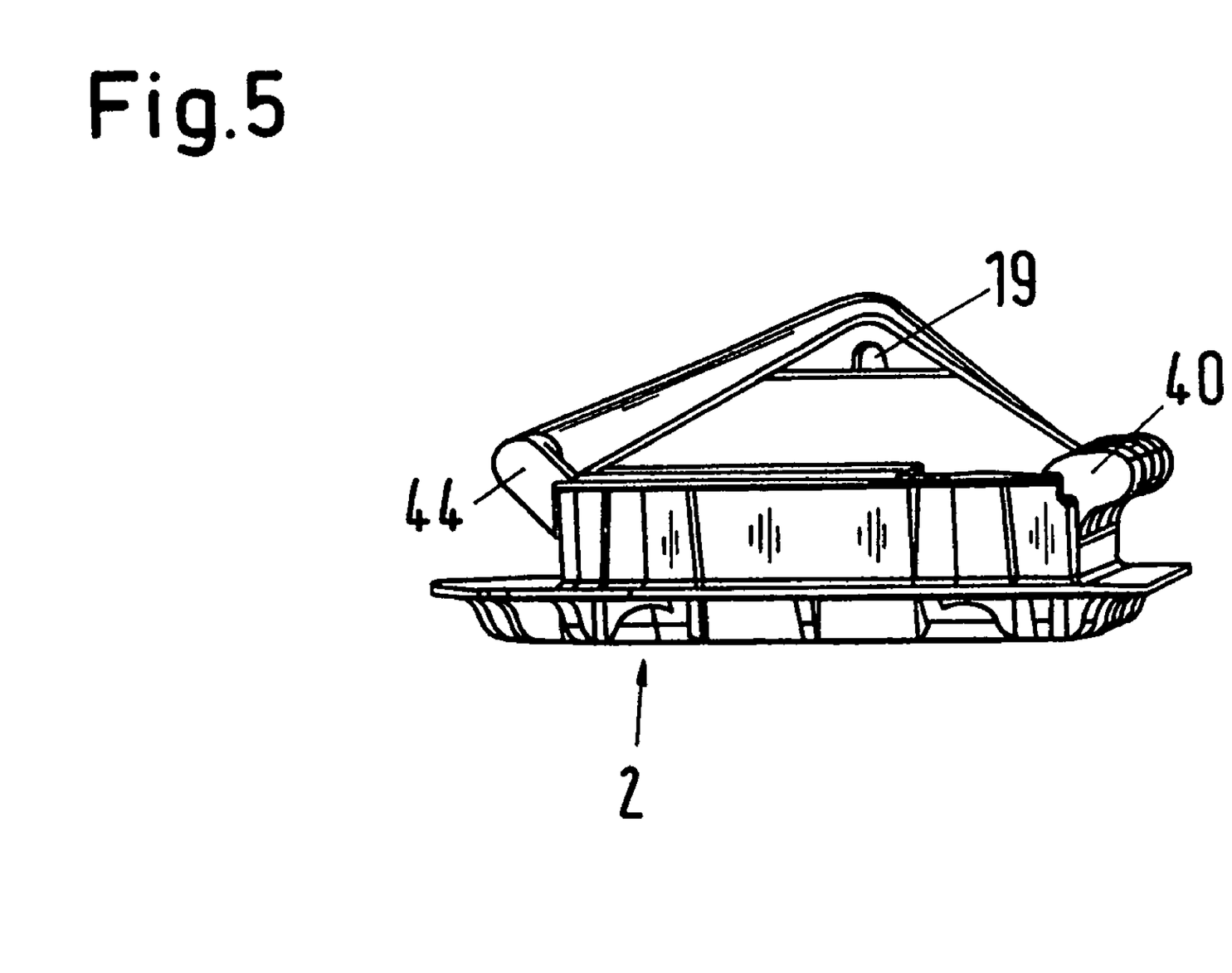

When the mirror head 3 assumes its operating position (FIG. 6), the joint parts 9 through 11 of the connecting part 5 and the joint parts 12, 13 of the connecting part 6 interlock (FIG. 7), while the two brackets 1, 2 are pressed firmly against one another by the tension spring 7. As FIG. 8 shows, one end 16 of the tension spring 7 is hooked in a web 17 of the bracket 1 and the other spring end 18 is hooked in an eye 19 (FIGS. 4, 5 and 8) of the connecting part 6. The tension spring 7 rests over most of its length on a supporting part 20 of the bracket 1 (FIG. 8).

The joint parts 9 through 11 are advantageously formed as one piece with the mirror-head-side bracket 1. In the installed exterior rearview mirror, the joint parts 9 and 10 are located on the front side in the direction of travel and form part of the front pivot axis 14. In principle, the joint parts 9, 10 are of identical design. They have a thickened connecting part 21 adjoining the bracket 1, from which a web 22 projects. This web has a rounded free longitudinal edge 23. The longitudinal edges 23 of the webs 22 lie in a common plane.

The webs 22 are parallel to and spaced apart from one another. The lateral surface 25 of the webs 22 facing the free longitudinal edge 24 of the connecting part 5 is uniformly curved. The lateral surfaces 25 of all webs 22 lie in a common, curved surface.

Figure 1:
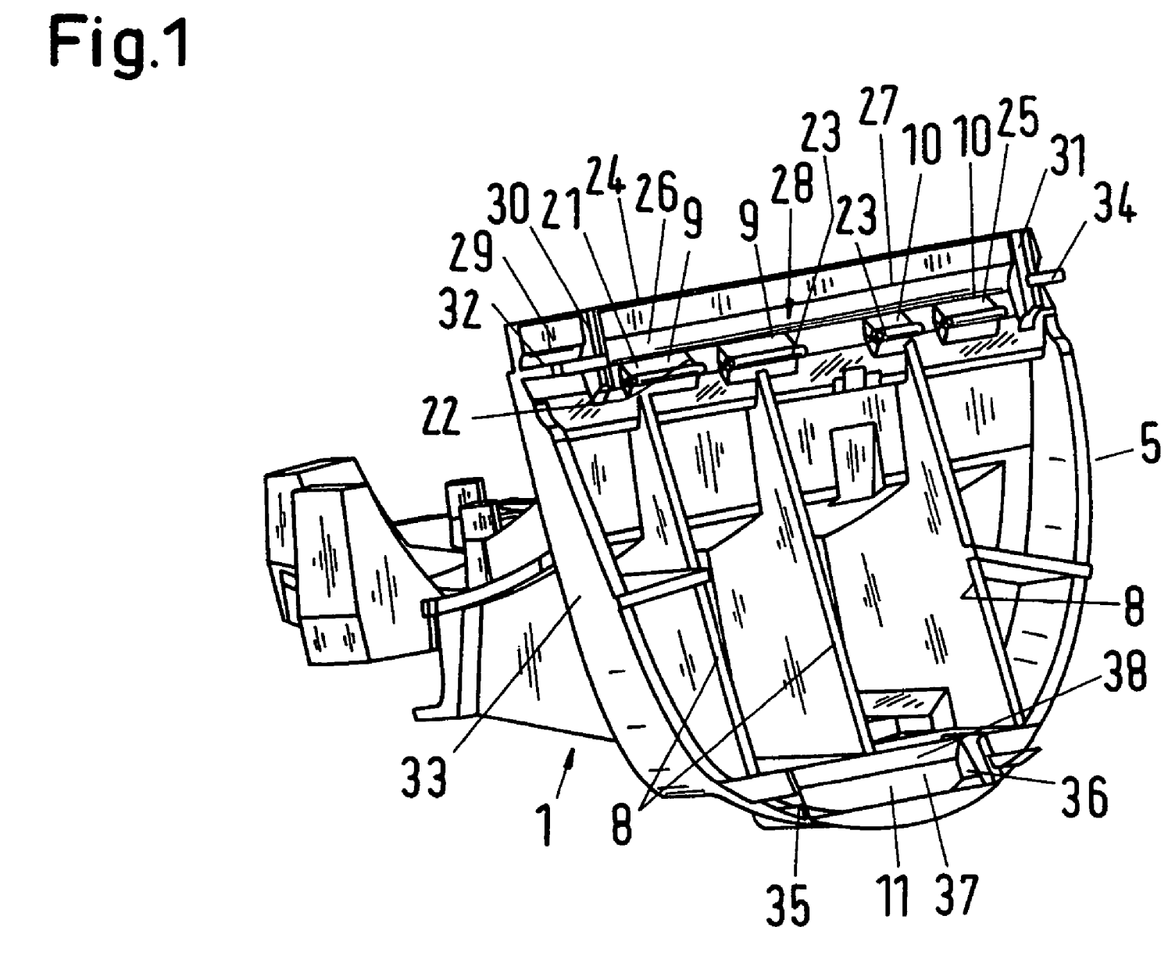
FIG. 1, a perspective view of a bracket of a mirror head of an inventive exterior rearview mirror, FIG. 2, another perspective view of the bracket of the mirror head from FIG. 1, FIG. 3, the bracket of the mirror head of the inventive exterior rearview mirror in top view, FIG. 4, a perspective view of the articulation region of the bracket of the mirror base of the inventive exterior rearview mirror, FIG. 5, a side view of the bracket of the mirror base from FIG. 4, FIG. 6, a front view of the brackets of the mirror base and mirror head of the inventive exterior rearview mirror, joined together, FIG. 7, a section along the line A-A in FIG. 6, FIG. 8, a section along the line B-B in FIG. 6, FIG. 9, a perspective view of the bracket of the mirror head of the inventive exterior rearview mirror, folded toward the back relative to the direction of travel, FIG. 10, a section along the line A-A in FIG. 9, FIG. 11, a section along the line B-B in FIG. 9, FIG. 12, a perspective view of the bracket of the mirror head of the inventive exterior rearview mirror, folded toward the back relative to the direction of travel, FIG. 13, a perspective view of the bracket of the mirror head of the inventive exterior rearview mirror, folded toward the front relative to the direction of travel, FIG. 14, a section along the line A-A in FIG. 13, FIG. 15, a section along the line B-B in FIG. 13, FIG. 16, a perspective view of the bracket of the mirror head of the inventive exterior rearview mirror, folded toward the front relative to the direction of travel.

As is evident from FIG. 7, the curved lateral surfaces 25 transition with uniform curvature into the bottom 26 of a receptacle 27 (FIG. 1), which accommodates the joint parts 12 of the connecting part 6 of the bracket 2 in a manner to be described later. The uniformly curved bottom 26 transitions into a uniformly curved side wall 28 of the receptacle 27 (FIGS. 1 and 7). As a result of the design described, the receptacle 27 has a cross-section in the shape of a circular arc.

The side wall 28 transitions into a flat end face 29 that is designed as a narrow strip and extends over the entire length of the straight longitudinal edge 24 of the connecting part 5.

The bearing-shell-shaped receptacle 27 is bounded at both ends by transverse webs 30 and 31 that are provided at a short distance from the joint parts 9 and 10 on the end faces. Adjoining the side of the transverse web 30 facing away from the adjacent joint part 9 is a longitudinal web 32, which extends to the side wall 33 of the connecting part 5. The longitudinal web 32 has a smaller separation from the longitudinal edge 24 of the connecting part 5 than do the webs 22 of the joint parts 9, 10. Projecting laterally from the end face of the transverse web 31 is a projection 34, which extends toward the connecting part 6 of the bracket 2.

The shell-shaped receptacle 27 is bounded on one side by the continuous side wall 28 and on the opposite side by the lateral surfaces 25 of the webs 22, which are spaced apart one behind the other. A larger separation is provided between the webs 22 of the joint parts 9 and the webs of the joint parts 10 than is provided between the webs themselves.

The opposite joint part 11 of the connecting part 5 is designed as a bearing shell 37 that has a cross-section in the shape of a circular arc (FIG. 7) and extends between two transverse webs 35 and 36 (FIG. 1). The shell-shaped receptacle 37 widens uniformly toward its free end (FIG. 7). In the receptacle 37, as in the receptacle 27, the axis of curvature of the bottom is the pivot axis 14 or 15. The transverse webs 35, 36 have a smaller separation from one another than the transverse webs 30, 31, which delimit the receptacle 27 in the longitudinal direction. Accordingly, the bearing-shell-shaped receptacle 37 is shorter than the opposite receptacle 27. The two receptacles 27, 37 are parallel to one another. The stiffening ribs 8 extend perpendicular to the axes of the receptacles 27, 37, and the ends of the ribs adjoin, at right angles, the connecting parts 21 and the side wall 38 of the receptacle 37 facing the receptacle 27. In this way, the joint parts 9, 10 and the side wall 38 of the receptacle 37 are well supported, so that forces arising in this area during folding of the mirror head 3 forward or backward in the direction of travel can be reliably absorbed.

The receptacle 27 of the connecting part 5 accommodates the joint parts 12 of the connecting part 6 of the mirror base 4. As is evident from FIGS. 4 and 5, the joint parts 12 are composed of cylindrical bearing parts 39, which extend between webs 40 projecting at an angle from the connecting part 6. The bearing parts 39 have an outside surface 41 which lies along the circumferential surface of an imaginary cylinder. As FIGS. 4 and 7 show, the bearing parts 39 have a slot 42 extending over their length, lending the bearing parts 39 a certain radial elasticity.

The connecting part 6 has, on its side opposite the bearing parts 39, a bearing part 43 that extends between two webs 44, 45 projecting laterally from the bracket 2 and has a slot 46 extending along its length. This slot 46 lends the bearing part 43 a certain radial elasticity as well.

In the installed position, the bearing parts 39 engage in the receptacle 27 and the bearing part 43 engages in the receptacle 37. The bearing parts 39, 43 are designed such that they are elastically slightly deformed radially upon placement in the receptacles 27, 37, so that they rest against the inner wall of the receptacles 27, 37 under preloading. The tension spring 7 pulls the two connecting parts 5, 6 and the joint parts 9-11 and 12, 13 tightly against one another so that the mirror head 3 in its operating position is held reliably on the mirror base 4. The end faces of the connecting parts 5, 6 that face one another are in area contact with one another. As FIG. 7 shows, the webs 22 of the joint parts 9, 10 of the bracket 1 project into end recesses 47, which are provided as shown in FIG. 4 between the bearing parts 39 and a transverse wall 48 of the bracket 2. The webs 40 between the bearing parts 39 lie in the area between adjacent webs 22 of the bearing parts 9, 10. Since the webs 22 engage the recesses 47 of the connecting part 6, the bearing parts 39 of the connecting part 6 can be enclosed over a circumferential angle of approximately 180°.

The bearing part 43 of the connecting part 6 is also enclosed by the wall of the receptacle 37 over approximately 180°. In the operating position of the mirror head 3 shown in FIG. 7, the slots 42, 46 in the bearing parts 39, 43 are arranged such that they are covered by the wall of the receptacles 27, 37. The slots 42, 46 extend outward in opposite directions from one another.

In FIGS. 6-8, the bracket 1 of the mirror head 3 is shown in the operating position of the exterior rearview mirror in which the mirror head projects laterally from the vehicle. The two connecting parts 5, 6 of the mirror head 3 and mirror base 4 rest against one another under the force of the tension spring 7. The joint parts 9 through 11 and 12, 13 are interlocked in the manner described above. The force of the tension spring 7 is great enough that the mirror head 3 rests firmly against the mirror base 4. The exterior rearview mirror is designed such that, in the event of an impact in or opposite to the direction of travel, the mirror head 3 can fold away relative to the mirror base 4 about the appropriate pivot axis 14 or 15.

FIGS. 9 through 12 show the case in which the mirror head 3 has been folded away toward the back viewed in the vehicle's direction of travel about the joint axis 15 relative to the mirror base 4 by a suitable impact. In the process, the bracket 1 of the mirror head 3 pivots about the axis 15 relative to the bracket 2 of the mirror base 4. The webs 22 and the receptacle 27 come away from the bearing parts 39, since the receptacle 27 is open toward the connecting part 6 of the mirror base 2, or in the direction of pivot.

Since the bearing part 43 is essentially cylindrical in design and the receptacle 37 has a corresponding outline, the bracket 1 can pivot about the axis 15 relative to the bracket 2 against the force of the tension spring 7 under the influence of the external force.

As soon as the influence of the external force ceases, the bracket 1 pivots back about the axis 15 into the operating position shown in FIGS. 6-8 under the force of the tension spring 7. During this pivoting motion, the receptacle 27 automatically encloses the bearing parts 39.

If the mirror head 3 sustains a forward impact in the direction of travel, then it can fold away toward the front in the direction of travel about the axis 14 relative to the mirror base 4 (FIGS. 13-16). During this folding motion, the receptacle 37 releases the bearing part 43. Since the opposite bearing parts 39 and the receptacle 27 have cylindrical circumferential surfaces, the bracket 1 of the mirror head 3 can pivot with its receptacle 27 on the cylindrical outer surface 41 of the bearing parts 39 about the axis 14.

As soon as the influence of the force ceases, the mirror head 3 folds back into its operating position under the force of the tension spring 7. In this process, the bracket 1 of the mirror head 3 pivots about the axis 14 until the bearing part 43 of the mirror base 4 engages the receptacle 37 of the mirror head 3.

Figure 2:
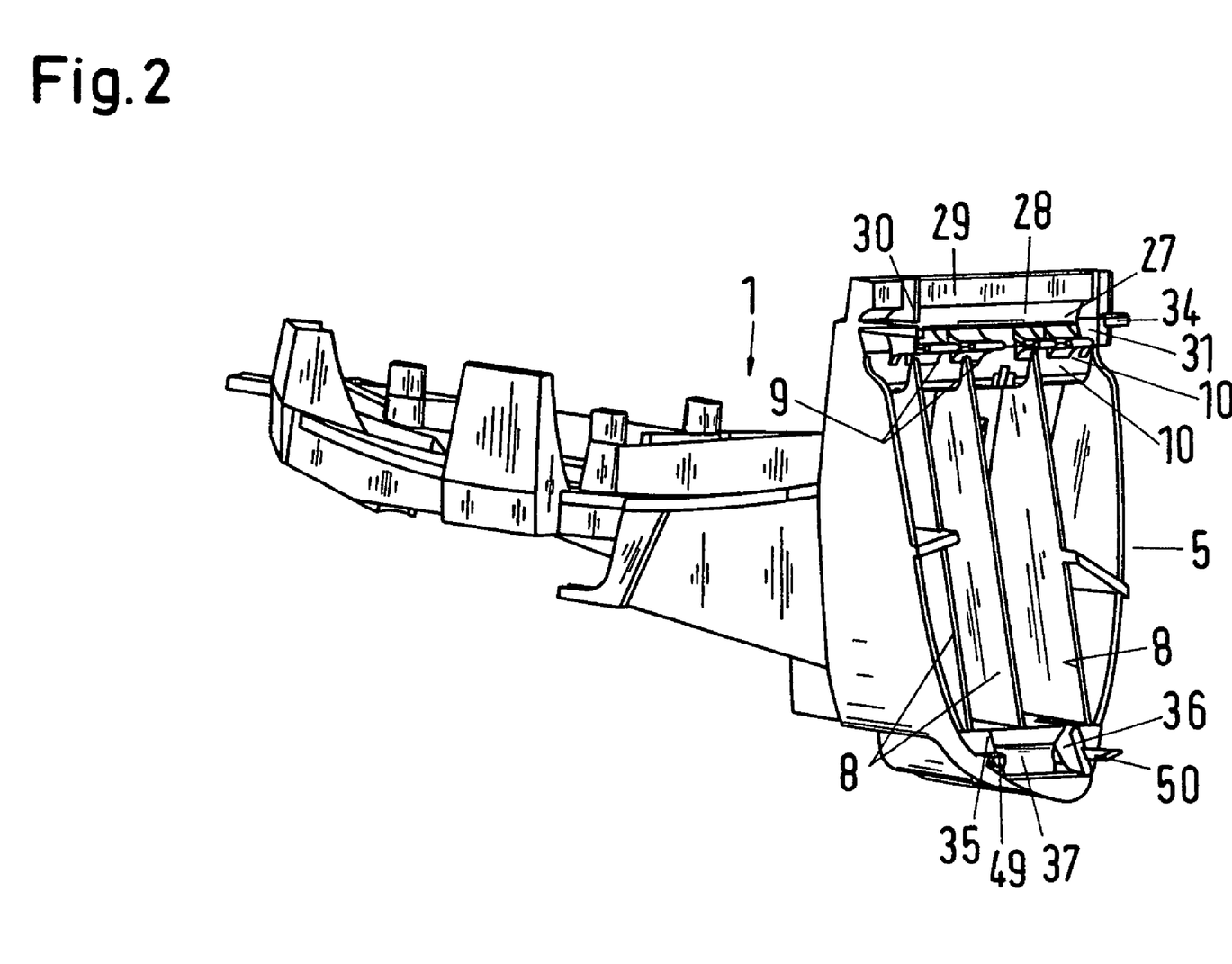
Figure 3:
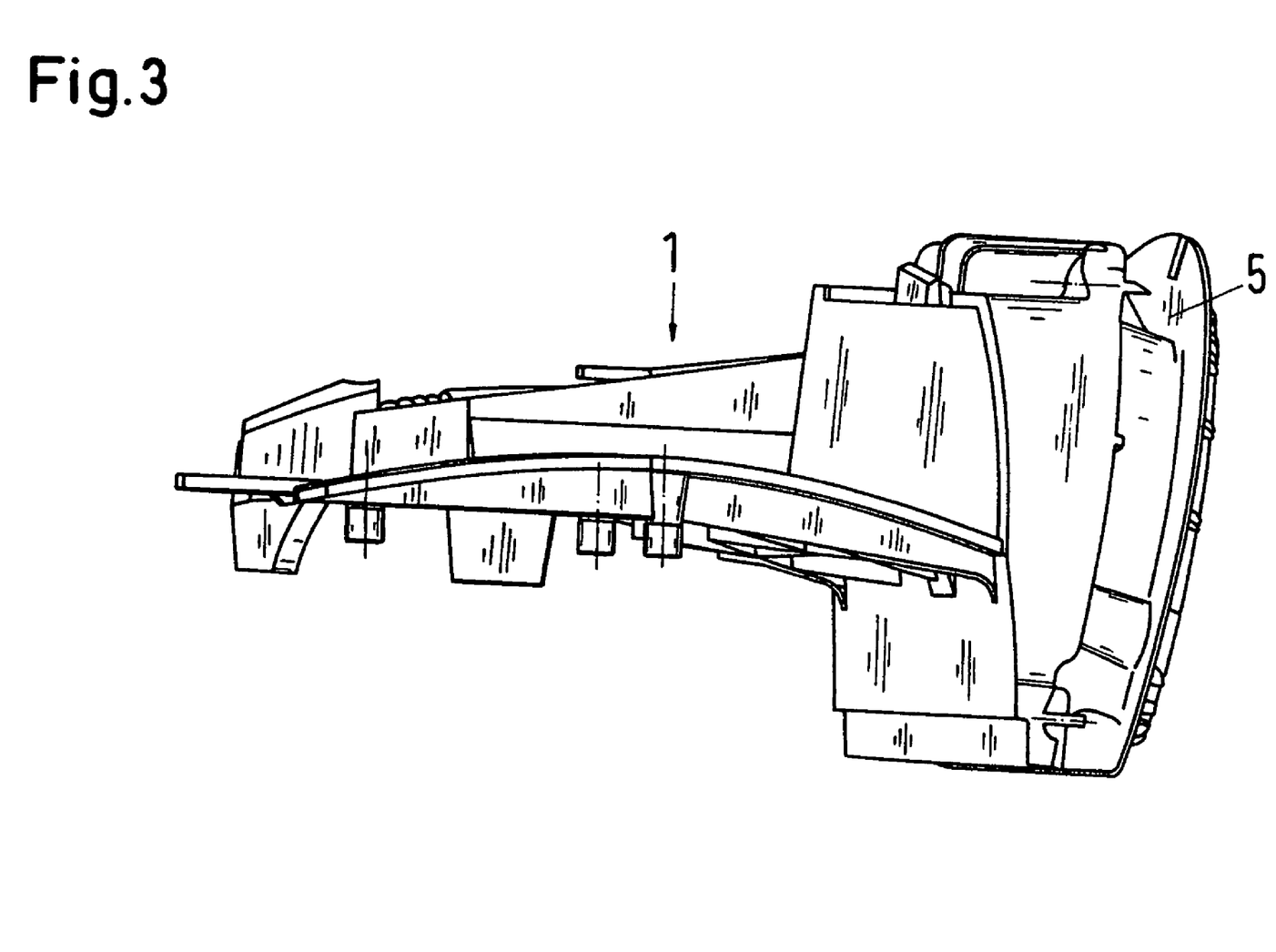

In the region next to the transverse webs 35 and 36 (FIGS. 1 and 2) that delimit the receptacle 37 are located projections 49, 50 (FIG. 1) that engage in end recesses 51 of the connecting part 6 of the mirror base 4 (FIGS. 4 and 14) in the operating position of the mirror head 3 (FIGS. 6-8). The recesses 51 are located immediately behind the bearing part 43 at the side facing the opposite bearing parts 39.

In the exterior rearview mirror described, no intermediate link, which would represent an additional component, is provided between the mirror head 3 and the mirror base 4. The force of the tension spring 7 suffices to hold the mirror base 4 and the mirror head 3 securely together. Even when the mirror head 3 is folded away relative to the mirror base 4 either forward or backward in the direction of travel in the manner described, the spring force ensures that the mirror head 3 and the mirror base 4 are held together securely. This effect is also assisted by the fact that the spring force increases during the folding process so that the mirror head 3 and the mirror base 4 are joined firmly enough together even though these two parts are supported only in an axis guide 14 or 15. Since no additional intermediate link is provided in the exterior rearview mirror, the result is simple and above all economical manufacture and assembly. Since the receptacles 27, 37 extend over almost the entire applicable width of the connecting part 5 of the bracket 1 of the mirror head 3, the joint parts 12, 13 that engage these receptacles 27, 37 are reliably guided and held. As a result, the folding motion of the mirror head 3, in particular, is also supported. At the same time, the described joint design also achieves a centering of the brackets 1 and 2 relative to one another so that the defined position is always reached after the mirror head 3 folds back into the operating position.

Since the receptacles 27, 37 and the associated mating joint parts 12, 13 are sufficiently long, they can be made of plastic with no problems. As a result, the exterior rearview mirror can be produced very economically.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. An exterior rearview mirror for a motor vehicle comprising:
   a mirror base including a base bracket (2) having first (39) and second (43) bearing parts spaced apart from and parallel to each other; and
   a mirror head including a head bracket (1) having first (27) and second (37) receptacles spaced apart from and parallel to each other such that said mirror head is foldable in the direction of travel about said first bearing part (39) and opposite to the direction of travel about said second bearing part (43), said first (27) receptacle is bound on either end by transverse webs (30, 31) and by a plurality of webs (22) spaced apart from and extending laterally to said transverse webs (30, 31), wherein said second receptacle (37) is separated from said second bearing part (43) when said mirror head is folded about said first bearing (39) and said first receptacle (27) is separated from said first bearing part (39) when said mirror head is folded about said second bearing (43).

2. An exterior rearview mirror according to claim 1, wherein said first bearing part (39) complements said first receptacle (27) and said second bearing part (43) complements said second receptacle (37).

3. Exterior rearview mirror according to claim 1, wherein the bracket on the mirror-base side has at least one bearing part that engages in the receptacle of the bracket on the mirror-head side to form the pivot/fold axis.

4. Exterior rearview mirror according to claim 3, wherein the bearing part is cylindrical in design.

5. Exterior rearview mirror according to claim 3, wherein the bearing part rests under elastic preloading in the receptacle.

6. Exterior rearview mirror according to claim 3, wherein the bearing part is designed to be elastically resilient in the radial direction.

7. Exterior rearview mirror according to claim 3, wherein the bearing part has at least one slot.

8. Exterior rearview mirror according to claim 7, wherein the slot runs axially.

9. Exterior rearview mirror according to claim 7, wherein the slot runs along the length of the bearing part.

10. Exterior rearview mirror according to claim 3, wherein the bearing part extends between webs that extend from the bracket on the mirror-base side.

11. An exterior rearview mirror according to claim 2, wherein each of said plurality of webs (22) defines a uniformly curved contact side for said first bearing part (39).

12. An exterior rearview mirror according to claim 2, wherein said first (27) and second (37) receptacles widen toward their direction of entry.

13. An exterior rearview mirror according to claim 11, including a plurality of stiffening ribs, each supporting each of said plurality of webs (22).

14. An exterior rearview mirror according to claim 13, wherein said plurality of stiffening ribs extend between said first (27) and second (37).

15. An exterior rearview mirror according to claim 13, wherein said plurality of stiffening ribs are formed as a single piece with said head bracket (1).

16. Exterior rearview mirror according to claim 1, wherein the brackets of the mirror head and of the mirror base are equipped with connecting parts with which they rest against one another in the operating position of the mirror head.

17. Exterior rearview mirror according to claim 1, wherein the joint parts interlock under spring force.

18. Exterior rearview mirror according to claim 17, wherein one end of a tension spring is attached in each case to the brackets of the mirror head and mirror base.

19. Exterior rearview mirror according to claim 1, wherein the joint parts are designed as a single piece with the mirror-head-side and mirror-base-side brackets.

* * * * *